United States Patent Office 2,778,858
Patented Jan. 22, 1957

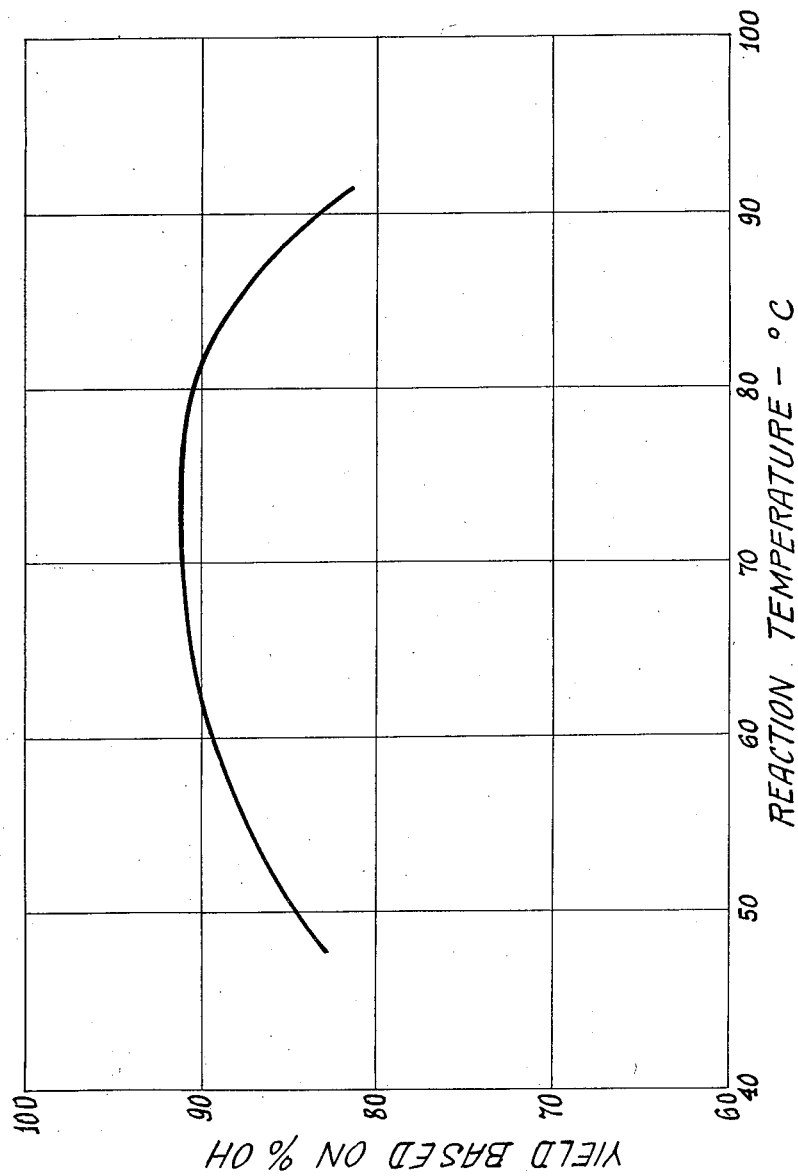

2,778,858

MAKING 2,2-DIMETHYLOLPROPANE

Francis L. Meinhofer, Allentown, Pa., assignor to Trojan Powder Company, a corporation of New York Application September 29, 1953, Serial No. 383,080

2 Claims. (Cl. 260—635)

This invention relates to an improved method of preparing dimethylolpropane by the condensation of formaldehyde and isobutyraldehyde in contact with water and an alkali metal hydroxide.

The method is rapid. It gives a good yield of dimethylolpropane of low color and high quality.

Dimethylolpropane has been prepared heretofore by interaction of formaldehyde, isobutyraldehyde, and alkali and by different workers. The early methods of preparation involved the use of dilute aqueous solutions of the reactants; in one case, water comprises up to 95% by weight of the total reaction mixture. Even with the very dilute mix, the reactions were carried out at room temperature, over a period of two or three weeks. Later reports indicate that more concentrated reaction mixtures may be employed to advantage, provided the temperature of reaction is kept low.

The reaction conditions described in U. S. Patent 2,135,063 to Walker et al. are representative of the use of concentrated reactions. In this patent, a yield of 75.5% is claimed from mixtures containing 30–60% water, at reaction temperatures of 5°–50° C., and in reaction times of 2–3 hours. In the example given in this patent, the aldehyde mixture, during the period of the alkali addition is maintained below 30° C. by cooling; thereafter the temperature is allowed to rise to 45° C. "Temperatures as high as 50° may be employed," the patent states, "but such temperatures are not recommended for the obtainment of optimum results . . . At temperatures in excess of 50° C. side reactions become bothersome and relatively dark colored reaction mixtures generally result."

It is said to be desirable to maintain the temperature of the reaction within the range 5°–30° C. at all times during the period of adding the alkali.

In U. S. Patent 2,400,724 to Walker, yields of 87% of dimethylolpropane are claimed, but hydrogenation of the intermediate first produced is required. As shown in this patent, our experience has proven that the intermediate, formisobutyraldol, may be prepared in high yields only in the event that the reaction temperature is kept at or below 20° C. Indeed, raising the reaction temperature from 20° to 60° C. resulted in lowering the average yield from about 85% to about 45%.

By proceeding contrary to the teaching of the prior art and to our own experience as to temperature effects, for certainly temperatures which destroy the intermediate formisobutyraldol cannot be expected to give high yields of the final product, dimethylolpropane, and without using hydrogenation, I have obtained average yields of 90–92% and in some cases, yields as high as 96% of substantially colorless dimethylolpropane in a simple rapid reaction. Furthermore, an entirely anomalous result has been found in that an intermediate, supposedly formisobutyraldol, may be prepared under the same high reaction temperatures provided that this intermediate is not isolated but is then used for the preparation of dimethylolpropane by further reaction with formaldehyde as shown in Example 6. Attempted isolation of formisobutyraldol from the intermediate liquor prepared at relatively high temperature results in low yields thereof.

My invention involves the use of a high initial reaction temperature in the range of 60°–80° C., such temperature being established early in the process. The condensation which I produce may be represented by the following equation:

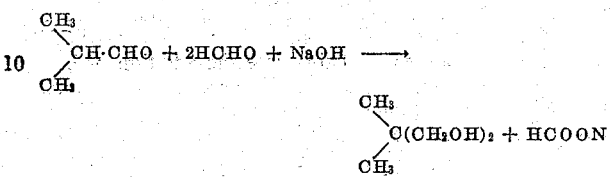

As shown in the equation, the ratio in which the reactants are consumed is 1 mole isobutyraldehyde to 2 moles formaldehyde and 1 mole sodium hydroxide. It is not necessary to use any considerable excess of any reactant. A slight excess of one or more of the materials is permissible, however, to insure more nearly complete exhaustion of another of the reactants. Thus I use to advantage 1.01 moles of the relatively inexpensive sodium hydroxide.

The drawing shows graphically the effect of temperature on the yield.

In the practice of the invention, the following general procedure is employed.

One molecular portion of isobutyraldehyde and two molecular portions of formaldehyde are first mixed. This mixture of aldehydes may contain water. The mixture is cooled to 0°–10° C. and the alkali metal hydroxide then added, in increments in accordance with usual practice. Initial cooling to below room temperature, i. e., below 25° C., before starting the addition of the base is not necessary but is advantageous in providing a means of absorbing the heat of the initial reaction and thus allowing for more rapid addition of base and hence for a shorter period of reaction, particularly when reaction mixtures containing 55% or less of water are used. In such cases the initial reaction proceeds vigorously and is accompanied by a very rapid evolution of heat. In all cases the temperature is raised to 60°–80° C. during the time of adding the first 5% of the total hydroxide to be used. Thereafter the temperature is maintained within the range 60°–85° C. during the addition of the rest of the sodium hydroxide and during the whole of the reaction, although higher temperatures for short periods of time are not objectionable. The reaction is discontinued when there is no further substantial decrease in alkalinity.

It is best, although not essential, to use isobutyraldehyde of high purity, i. e. 90% or better. The formaldehyde employed may be commercial formalin solution containing approximately 37% formaldehyde. All or part of the formaldehyde, however, may be added as a formaldehyde polymer. If solid formaldehyde polymer is used, it is advantageous to add a quantity of water such that the final reaction mixture will contain no less than 45% water.

The solution of base which is to be added may be of any concentration consistent with the concentration of water to be established in the total reaction mix. I have found the use of a solution containing approximately 45% of the alkali metal hydroxide to be most suitable for our purposes. Since any of the alkali metal hydroxides may be employed in this reaction, the choice of the base to be used depends mainly upon economic considerations. Sodium hydroxide is, therefore, the base that I ordinarily use.

The solution of alkali metal hydroxide is added to the mixture of aldehydes with rapid stirring, and at such a rate of addition that the reaction temperature reaches 60°–80° C., usually 68°–75°, within 3 to 5 minutes and during the addition of the first 5% of the alkali solution. When a mixture of 37% formaldehyde solution, isobutyraldehyde, and a 45% solution of sodium hydroxide are employed, I find it desirable to interrupt the addition of the sodium hydroxide solution when the temperature reaches about 30° C. Within 1 to 2 minutes after the interruption, the temperature will normally reach 70° to 75° C. and then begin to drop. In the event that the temperature rises above 75° C., cooling is necessary to prevent loss of isobutyraldehyde. Cooling may be omitted where base addition has been interrupted and the addition is not resumed until a temperature of not over 75° C. has been obtained. At this time the addition of base is resumed at such a rate that the temperature remains within the ranges stated. Cooling may be used if desired to hasten the rate of addition of the base. Temperatures as high as 90° or even slightly higher are permissible for short periods of time without adverse effect on the color of the reaction liquor or yield of dimethylolpropane. The addition of the base is completed normally in about 25–45 minutes.

My method of condensing isobutyraldehyde and formaldehyde, using a high reaction temperature, may be applied successfully also to the very dilute reaction mixtures which, by conventional methods, give only low yields on long standing. With such dilute reaction mixtures, it is necessary to resort to heating, instead of cooling, to maintain the desired reaction temperature.

When the course of my reaction was followed by determining the amount of unused base, I found that 98.6% of the base, in a dilute reaction mixture, was consumed in a total reaction time of 45 minutes and in the more concentrated reaction liquors, i. e. 45%–50% water, within 10 minutes after addition of the last increment of the base.

The invention will be illustrated in greater detail by description in connection with the following specific examples of the practice of it. In these examples and elsewhere herein, proportions are expressed as parts by weight unless stated to the contrary.

EXAMPLE 1

In a vessel provided with stirrer, thermometer, cooling means, and an inlet for alkali solution, there were placed 221 parts of 98% isobutyraldehyde and 489 parts of 37% formaldehyde solution. Stirring was begun and the charge was cooled until the temperature reached 3° C. Cooling was then discontinued and the addition of a solution of 123 parts of sodium hydroxide dissolved in 150 parts of water was begun. When the temperature reached 31° C., the addition of the hydroxide was interrupted. The temperature rose. Cooling was resumed and so controlled that the temperature rose from the initial 3° C. to a maximum of 75° in 4.9 minutes and before 5% of the total alkali solution had been added. After a short time, cooling was discontinued and the addition of base resumed. Slight cooling was used, to maintain the temperature between 70° and 74° C. The total time of addition of alkali was 33 minutes. After an additional 10 minutes, the reaction mixture showed no continuing substantial decrease in alkalinity. The mixture was then made slightly acid, to pH 5–6, with phosphoric acid and the acidic mixture was subjected to continuous extraction with benzene to remove dimethylolpropane. The benzene extract was chilled and filtered, to give on the filter 285 parts of dimethylolpropane. This product melted at 130°–130.5° C. and had an OH content of 32.16% equivalent to a purity of 98.5%. The result represents a yield of 91.3%.

In a variation of this example, the initial cooling to 3° C. was omitted. Instead, the alkali was added to the mixed aldehydes at an initial temperature of 60° C. Cooling was started when the temperature reached 68° and used intermittently throughout the remainder of the base addition to maintain the temperature within the prescribed limits. A yield of 90.9% dimethylolpropane was thus obtained.

EXAMPLE 2

The materials used and the reaction conditions employed were the same as those described in Example 1 except as noted below.

After the addition of all of the sodium hydroxide solution, which required 29 minutes, stirring was continued for 2 hours before acidification with phosphoric acid and extraction with benzene.

Chilling of the final benzene extract followed by filtration, to remove the separated product, gave 288 parts of crystalline dimethylolpropane having a hydroxyl value of 32.43% and melting point of 129.5–130.0° C. This represents a yield of 92.3% and a purity of 99.3%.

EXAMPLE 3

The materials and reaction conditions were the same as those in Example 1 except that the time of addition of the alkali was 37 minutes. Three sets of samples were withdrawn at intervals from the reaction liquor before the addition of acid and the amount of unused sodium hydroxide was determined by titration with standard acid. Table I, in which the results are summarized, shows that the reaction is substantially complete within 10 minutes after the addition of the last of the alkali. This is also indicated by the almost equal yields obtained in Examples 1 and 2 above.

Table I

| Reaction Time after Addition of Last of the NaOH | Moles of Unreacted NaOH |
|---|---|
| 10 minutes | 0.034 (Total added 1.01). |
| 2 hours | 0.023. |
| 24 hours | 0.019. |

EXAMPLE 4

The materials used and the reaction conditions employed were the same as those in Example 1 except as follows: The time of addition of the alkali was 40 minutes. The temperature of reaction rose to 86° C. for several minutes; this high temperature did not cause the formation of a colored reaction product, even 105° or so being permissible for a short period of time. When the addition of base was completed, stirring was continued for an additional period of 30 minutes. The solution of the reaction product was then neutralized with oxalic acid and transferred to a concentrator where it was evaporated to dryness under reduced pressure at 80°–90° C. The resulting solid was cooled and then taken up in hot acetone and the acetone solution filtered. From this acetone solution three crops of crystalline material were obtained on cooling and some evaporation. The weight and analysis of each fraction are given in Table II.

Table II

| Fraction | Weight | Percent OH | Calculated Weight of Dimethylolpropane |
|---|---|---|---|
| 1 | 237 | 31.11 | 227.6 |
| 2 | 50 | 31.16 | 47.7 |
| 3 | 10 | 27.91 | 8.5 |
| Total |  |  | 283.8 |

The 283.8 parts of dimethylolpropane represent a yield of 91.0%.

EXAMPLE 5

In a 1 liter flask fitted with a stirrer, thermometer, and buret, there were placed 36.8 grams of 98% isobutyraldehyde, 82.0 grams of 37% formaldehyde solution, and 273.5 grams of water, to give a reaction mixture containing 80% water. Stirring was begun and a solution of 20.4 grams of sodium hydroxide dissolved in 25.0 grams of water was added slowly, the initial temperature being 30° C. The temperature rose rapidly to 60° C. before 5% of the total sodium hydroxide had been added, at which point the flask was immersed in a water bath held at 73° C. The addition of sodium hydroxide was completed in 27 minutes. After stirring for an additional 18 minutes, the reaction mixture was chilled in a salt-ice bath and diluted to exactly 1 liter. Titration of samples of this liquor with standard acid indicated that 98.6% of the sodium hydroxide had been consumed. Crystalline dimethylolpropane of high purity was obtained by exhaustive benzene extraction of the neutralized liquor. The yield was good.

The condensation of formaldehyde and isobutyraldehyde in contact with an alkali metal hydroxide was accomplished in an almost quantitative manner, even in dilute solutions and in the short time of 45 minutes when the high reaction temperature was employed.

EXAMPLE 6

This example describes making first formisobutyraldol and then the dimethylolpropane.

In a 500 ml. flask fitted with a stirrer, thermometer, and buret, there were placed 73.5 grams of 98% isobutyraldehyde and 81.5 grams of 37% formaldehyde solution. The resulting mixture contained 1 mole of each of the aldehydes, in contrast to the mixture employed in Examples 1–5 in which the mole ratio of formaldehyde to isobutyraldehyde was 2:1. The mixture was chilled to 0° C. and to it were added 9.1 grams of a sodium hydroxide solution (10% of the total solution) made by dissolving 41.0 grams of sodium hydroxide in 50.0 grams of water. This amount of alkali establishes the pH above 7, at a level suitable for aldol formation; the amount of alkali added at this point may be varied. Within 4 minutes the temperature began to rise rapidly. I immersed the reaction flask in a salt-ice bath. The temperature rose to a maximum of 74° C. As the temperature began to drop, the cooling bath was removed and the reaction was allowed to continue for 30 minutes within the range 60°–85° C. The alkalinity became practically unchanging. The aldol had formed.

An additional 81.5 parts of formaldehyde solution were then added. The remainder of the sodium hydroxide solution (1 mole total) was next introduced at such a rate that the temperature was maintained at approximately 70° C. After a short additional reaction period, the reaction mixture was made acid with phosphoric acid and subjected to continuous extraction with benzene. Chilling of the benzene extract, followed by filtration, gave 94.0 parts of crystalline dimethylolpropane on the filter, a yield of 90.4%. This material melted at 129.5°–130.5° C.

It has been found that sodium carbonate may be substituted for that portion of the sodium hydroxide used in the initial phase of this reaction without reducing the yield or increasing the time of reaction if the same high temperature is employed.

The use of the rapid condensation of equimolar portions of formaldehyde and isobutyraldehyde, as described in this example, provides a convenient and rapid method of preparing formisobutyraldol. This aldol is a useful intermediate in the preparation of other materials, one example of which is the reaction with additional formaldehyde, as in the latter part of this example, to give dimethylolpropane.

It will be understood also that it is intended to cover all changes and modifications of the examples of the invention herein chosen for the purpose of illustration which do not constitute departures from the spirit and scope of the invention.

What I claim is:

1. In making dimethylolpropane of the formula $$(CH_3)_2C(CH_2OH)_2$$

the process which comprises mixing 1 mole of isobutyraldehyde with an aqueous solution of approximately 2 moles of formaldehyde, introducing an alkali metal hydroxide in increments and in the total proportion of about 1 mole into the mixed aldehydes, raising the temperature of the resulting mixture during the time of adding the first 5 percent of the alkali metal hydroxide to a temperature within the range 60°–80° C., thereafter maintaining the temperature of the resulting mixture during the reaction period within the range 60°–85° C., and continuing contact of the reacting materials, after the last of the hydroxide is added, until there is no further substantial decrease in alkalinity of the mixture, whereby dimethylol propane is produced in good yield and quality.

2. In making dimethylolpropane of the formula $$(CH_3)_2C(CH_2OH)_2$$

the method which comprises forming a mixture of an aqueous solution of formaldehyde 1 mole, isobutyraldehyde 1 mole, and sodium hydroxide 0.1 mole, this alkali making the pH of the mixture above 7 and suitable for the formation of an aldol, maintaining the mixture at a temperature within the range 60°–80° C. until heat evolution substantially ceases, whereby an aldol is formed, adding another mole of formaldehyde to the aldol containing mixture, then adding additional sodium hydroxide in increments until the total sodium hydroxide added first and later totals about 1 mole, and maintaining the temperature within the range 60°–85° C. until the alkalinity of the mixture comes to be practically constant.

References Cited in the file of this patent

UNITED STATES PATENTS

| | | |
|---|---|---|
| 1,878,040 | Voss | Sept. 20, 1932 |
| 2,135,063 | Walker et al. | Nov. 1, 1938 |
| 2,372,602 | Owens | Mar. 27, 1945 |
| 2,400,724 | Walker | May 21, 1946 |

OTHER REFERENCES

Whitmore et al.: J. A. C. S., vol 63 (1941) pps. 126–7.

Shortridge et al.: J. A. C. S., vol. 70 (1948) p. 948.

Handbook of Chemistry & Physics (34th ed.) p. 1955.